United States Patent [19]
Hightower

[11] 3,902,687
[45] Sept. 2, 1975

[54] AIRCRAFT INDICATOR SYSTEM

[76] Inventor: Robert E. Hightower, 18265 SW. Salix Ridge, Aloha, Oreg. 97005

[22] Filed: June 25, 1973

[21] Appl. No.: 373,503

[52] U.S. Cl.......... 244/77 A; 73/178 T; 235/150.22; 235/150.26; 244/77 B; 340/27 NA
[51] Int. Cl. .................................................. B64c 13/18
[58] Field of Search ...................... 73/178 R, 178 T; 116/114 E; 128/32, 33; 180/99; 235/150.22, 150.26; 244/77 A, 77 B, 77 D, 122 R; 303/19; 340/27 NA, 278, 27 R, 27 SS; 343/107, 108 R

[56] References Cited
UNITED STATES PATENTS

| | | | |
|---|---|---|---|
| 1,941,533 | 1/1934 | Bennett | 340/27 R |
| 2,682,042 | 6/1954 | Harcum | 340/27 R |
| 2,827,621 | 3/1958 | Reichert et al. | 340/27 SS |
| 3,037,499 | 6/1962 | Cummins | 128/33 |
| 3,157,853 | 11/1964 | Hirsch | 340/27 R |
| 3,455,296 | 7/1969 | McCaleb | 128/33 |
| 3,497,870 | 2/1970 | Balding | 73/178 R |
| 3,613,673 | 10/1971 | La Hue | 128/33 |
| 3,653,375 | 4/1972 | Raffel | 128/33 |

OTHER PUBLICATIONS
Electronic Design, March 15, 1973, p. 26.

*Primary Examiner*—Duane A. Reger
*Assistant Examiner*—Stephen G. Kunin
*Attorney, Agent, or Firm*—Klarquist, Sparkman, Campbell, Leigh, Hall & Whinston

[57] ABSTRACT

A tactile indicating system for aircraft includes a seat cushion provided with left and right vibrators which indicate to the pilot the deviation from a course selected via a radio navigational aid receiver. If the pilot is off course, one of the vibrators is actuated for indicating the corrective action needed, while the frequency of vibration indicates the error magnitude. An attachment may be slipped over the pilot's leg, such attachment having vibrators for indicating deviation from a predetermined glide slope.

14 Claims, 11 Drawing Figures

AIRCRAFT INDICATOR SYSTEM

BACKGROUND OF THE INVENTION

The present invention relates to an aircraft indicator system, and particularly to a system for providing tactile communication to the pilot in response to aircraft instrument indications.

When a pilot is flying by instrument flight reference, he has a very heavy visual workload. He will probably attempt visual observation of his surroundings while at the same time monitoring the flight instruments including those relating to altitude, rate-of-climb, airspeed, turn-bank, directional gyro, attitude and proboably some type of radio navigational indication of the course being followed. As an instrument landing is approached, the visual workload increases since the pilot must additionally concentrate on indicated course deviation for keeping the aircraft accurately centered on the runway approach course and glide slope. The pilot will also watch for some visual contact with the ground for completing the landing.

The near-impossibility of proper attention to each visual indication has led to various proposals for supplying non-visual information or warnings to the pilot. Thus, some instruments employ lights which flash in the event certain limits are exceeded, but clearly the use thereof is somewhat limited. Also, sound-emitting devices may be employed to signal the pilot upon the occurrence of predetermined conditions. However, the audible outputs produced must compete with the high noise level in the aircraft, radio communications, and the like. Various tactile communicating means have been proposed wherein some attachment is made to the pilot's hand or body for providing a predetermined indication via the sense of touch. Such attachments are usually highly specialized, and inconvenient or uncomfortable, rendering utilization thereof by the average pilot unlikely.

SUMMARY OF THE INVENTION

In accordance with the present invention, an aircraft indicator system comprises a seat means for supporting the pilot, the seat means including plural spaced vibratory means for supplying tactile indication to the pilot. The seat means desirably comprises a cockpit seat cushion having the vibratory means located therewithin. Means selectively energize the vibratory means for indicating the divergence of a control function from a desired value, as well as the direction or sense of such divergence. For example, the vibratory means may be operated in response to information from an ILS-VOR receiver for indicating the deviation and sense of deviation of the aircraft from the preselected course. According to a particular embodiment, the frequency of vibration indicates the extent or magnitude of deviation. Also in accordance witha particular embodiment, an extension for such seat cushion includes further plural vibratory means for indicating information in a second coordinate direction, i.e., deviation from glide slope.

The tactile aircraft indicator system according to the present invention frees the pilot's visual scan for concentration on fewer instruments, with the pilot occasionally cross-checking the instrument readings which have been converted to vibration, e.g., when such vibration is indicative of a need for corrective action. The present system does not interfere with the pilot's other senses, such as hearing, needed for radio communication, nor does the present system visually distract the pilot by means of flashing lights or the like. Moreover, the seat means does not restrict the pilot's movement nor limit his comfort. The seat means may be attached to an existing cockpit seat or built into a seat whereby the pilot cannot detect the presence of the vibratory means, in the absence of a warning signal delivered therefrom. The use of an extension for glide slope indication or the like is optional and provides information during the landing approach. The extension, which is readily available at the side of the cushion, does not materially restrict the pilot's movement.

It is accordingly an object of the present invention to provide an improved aircraft indicator system for supplying tactile communication to a pilot in response to aircraft instrument indication.

It is another object of the present invention to provide an improved aircraft indicator system for supplying tactile communication to the pilot relative to navigational aid information received by the aircraft.

It is another object of the present invention to provide an improved aircraft indicator system for supplying tactile communication to the pilot relative to the direction of deviation of the aircraft from a flight path as derived from ground transmitted radio frequency signals.

It is another object of the present invention to provide an improved aircraft indicator system for supplying information to the pilot in a manner which does not increase the pilot's visual workload, nor restrict his movement and comfort.

It is another object of the present invention to provide an improved aircraft indicator system for supplying tactile communication to the pilot without requiring extensive attachment of equipment or sensing devices to the pilot.

It is a further object of the present invention to provide an improved aircraft indicator system for lessening the requirements on the pilot's visual scan in regard to specified instruments to which additional tactile communication means are coupled.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 3:
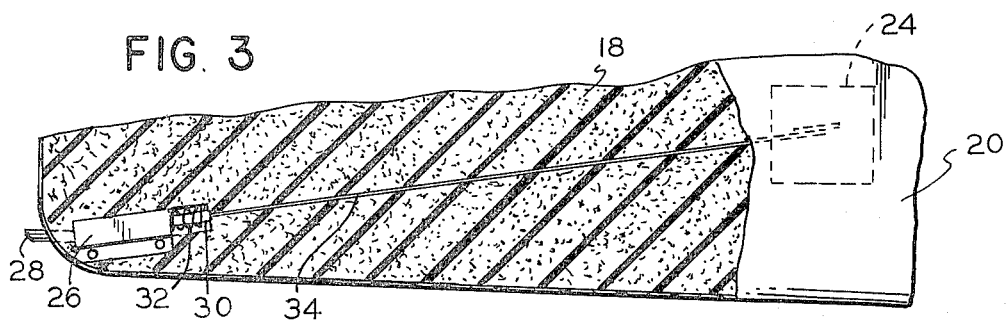
FIG. 3 is a partially broken away plan view of a lower right-hand side of the FIG. 2 cushion.
Figure 4:
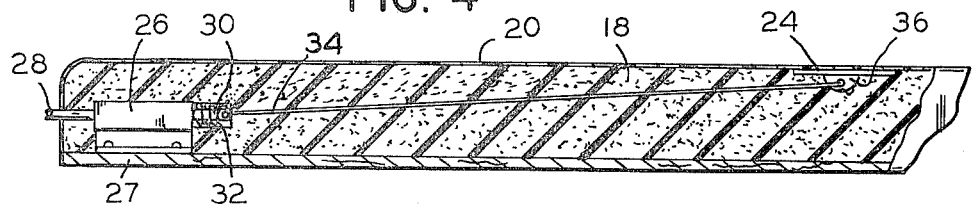
FIG. 4 is a side view of the lower right-hand portion of the FIG. 2 seat cushion, partially broken away in cross section.

Referring to the drawings, a first embodiment of an aircraft indicator system according to the present invention is particularly illustrated in FIGS. 1 through 5. The indicator system includes a seat cushion 10 which may be removably secured to a cockpit seat 12 in aircraft 14 by means of a pair of straps 16 suitably extended and buckled underneath the cockpit seat. The seat cushion includes a foam interior 18 and a vinyl cover 20, the overall seat cushion having a rectangular or trapezoidal shape adapting the same for convenient and secure mounting upon the cockpit seat. The underside of the top layer of vinyl of the seat cushion is provided with left and right vibratory plates 22 and 24 which are secured as by cementing to the underside of the vinyl covering. These plates are positioned at locations in the cushion approximately equi-spaced from front to back, but near the left-hand side of the cushion and near the right-hand side of the cushion where vibration of the plates can provide a direct tactile stimulation to the pilot or other individual seated upon the cushion. In order to avoid damage to electromagnetic means which initiate the vibration, such electromagnetic means are suitably located at the rear corners of the cushion where they are unlikely to be damaged by pressure applied thereto. The electromagnetic means associated with plate 24 is illustrated in FIGS. 3 and 4, and comprises a solenoid device 26 having a solenoid coil (29 in FIG. 10) and a connecting cable 28 for energizing the same. The solenoid further comprises a plunger 30 formed of magnetic material and spring-biased away from the solenoid by a spring 32 positioned between the solenoid and the forward end of the plunger. When the solenoid is energized, the plunger 30 is drawn within the solenoid against the bias of coil 32. Solenoid 26 is secured to a lower support board 27 which comprises the underside of the cushion.

A linkage arm 34 is pivotally connected to the forward end of plunger 30, and extends through the foam interior of the cushion 18 toward the aforementioned plate 24 where it pivotally engages a bracket 36 extending downwardly from the approximate center of plate 24. When the solenoid is energized, linkage 34 is drawn to the right, and tilts plate 36 slightly. According to the present invention, the solenoid 26 is energized with a pulsating or vibratory input whereby a distinct vibration is conveyed to plate 24, which vibration can be easily felt by an individual seated upon the cushion.

Plate 22 is similarly connected by means of a linkage to a solenoid (not shown) positioned at the left rear of the cushion and enpowered via cable 38. As will hereinafter become more evident, one or the other of the plates 22 and 24 is caused to vibrate by its solenoid in the case of deviation of the aircraft from a predetermined course determined by ground transmitted radio frequency signals, while the frequency of vibration is indicative of the magnitude of the deviation. The solenoid selected to vibrate indicates the direction of deviation, or the direction of the course correction required.

Figure 5:
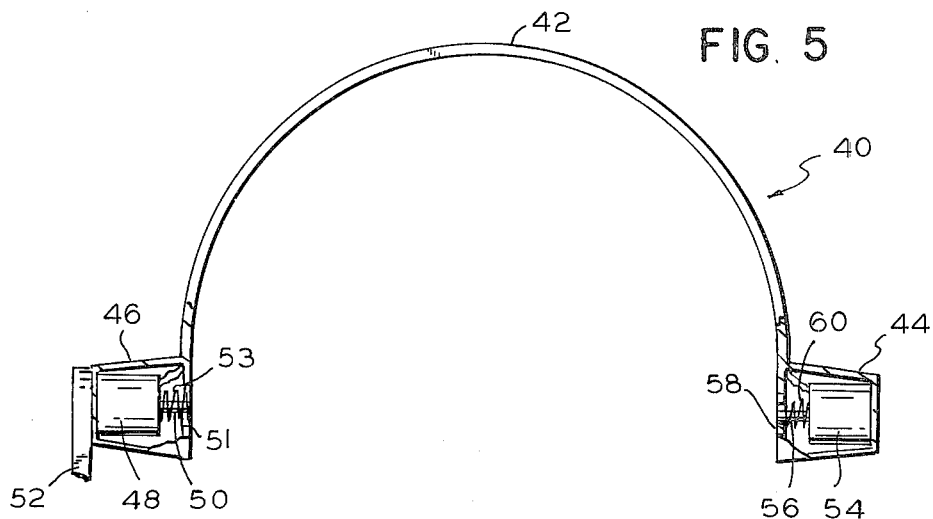
FIG. 5 is a side view, partially broken away in cross section, of an extension member for the FIG. 2 cushion, such extension member being adapted for application to the pilot's leg.

The cushion is further provided with an extension member in the form of a leg clamp 40 more clearly illustrated in FIG. 5. The clamp includes a substantially U-shaped, flexible steel band 42 adapted to fit over a leg of a pilot seated upon the cushion 10. The steel band carries an upper housing 44, adapted to communicate with the top of the pilot's leg, and a bottom housing 46 adapted to communicate with the underside of the pilot's leg. Considering housing 46, the same includes a solenoid 48 having a plunger 50 extending between a metal or vinyl diaphragm 51 coplanar with the inside of U-shaped band 42. A spring 53 biases the plunger away from the solenoid, but when the solenoid is actuated, the plunger 50 is drawn inwardly of the solenoid. The energizing cable for the solenoid suitably comprises a flat rubber ribbon 52 enclosing the energizing conductors while supporting the clamp 40 from the forward right-hand corner of the seat cushion. The ribbon 52 is suitably buried within the foam of the seat cushion and extends rearwardly from the cushion, as illustrated, for connection to control circuitry.

The housing 44 similarly includes a solenoid 54 provided with a plunger 56 attached to a diaphragm 58, with a biasing spring 60 urging the plunger 56 outwardly from the solenoid. The power leads for the solenoid 54 may be recessed within band 42 for connection to control circuitry via cable 52.

As hereinafter more fully described, the vibratory members, comprising diaphragms 52 and 58, are selectively operated when the aircraft is above or below a preselected glide slope determined by ground transmitted radio frequency signals. The diaphragms are vibrated by means of impulses delivered to solenoids 48 or 54 having a frequency proportional to the divergence of the aircraft from the desired glide path. The diaphragm which vibrates indicates the direction of divergence, or the direction of corrective action which is required.

Figure 1:
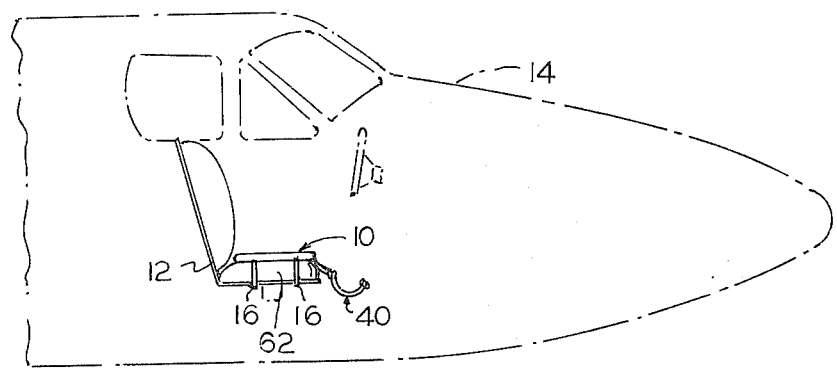
FIG. 1 is a phantom view of an aircraft employing an aircraft indicator system according to the present invention.
Figure 2:
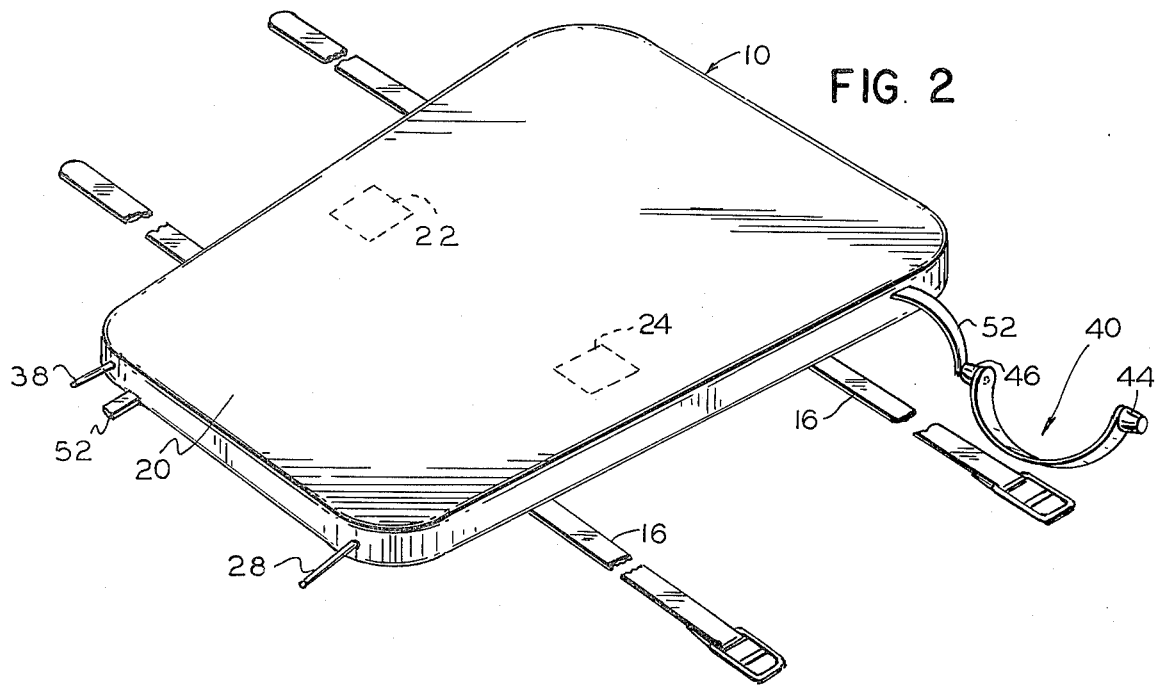
FIG. 2 is a perspective view of a seat cushion for supplying tactile communication to an aircraft pilot according to the system of the present invention.

While a portable seat cushion is illustrated in the foregoing drawings, which cushion may be strapped upon an existing aircraft cockpit seat, it will be readily appreciated that the cushion may be fully incorporated into the seat, e.g., so as to comprise the lower cushion 62 of the seat as illustrated in FIG. 1.

Figure 6:
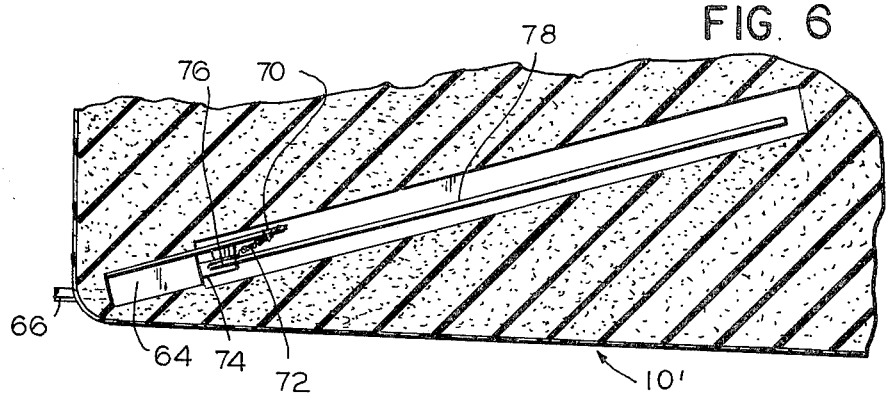
FIG. 6 is a cross-sectional view, partially broken away, of an alternative seat cushion according to the present invention, illustrating alternative vibratory means.
Figure 7:
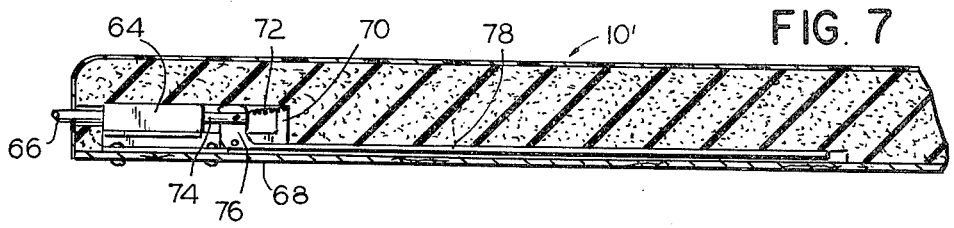
FIG. 7 is a vertical cross section, partially broken away, of the FIG. 6 cushion.

An alternative vibratory means for a seat cushion is illustrated in FIGS. 6 and 7, and may be employed in place of the aforementioned plates 22 and 24 and associated driving means. In FIGS. 6 and 7, the vibratory means for the right-hand side of a seat cushion 10' is illustrated, and the lefthand side vibratory means may be substantially identical. A solenoid 64, energized via a connecting cable 66, is secured to a support board 68 forming the underside of the cushion 10'. The solenoid is further supplied with a forward bracket arm 70 to which a spring 72 is anchored, with the opposite end of the spring being connected to solenoid plunger 74. Solenoid plunger 74 pivotally engages an upwardly extending arm 76 of a striker 78, while the lower end of arm 76 is pivoted to the lower part of bracket arm 70. Energization of solenoid 64 draws plunger 74 to the left in FIG. 7 against the bias of spring 72, causing the striker 78 to move upwardly. Striker 78 is suitably a rod formed of spring metal whereby the extent of its upward movement will be dependent upon the weight of the individual seated upon the cushion 10'. However, pulsation of solenoid 64 will be distinctly felt as a vibration by one seated upon the cushion.

While two preferred embodiments of vibratory means within the cushion are illustrated herein, it will be readily appreciated that many other vibratory devices may be substituted therefor. For example, motor driven vibration devices may be disposed within the seat cushion, or a diaphragm formed of magnetically permeable material may be employed which is vibrated by an electromagnet located in spaced relation thereto and receiving electrical pulsations. Various other mechanical linkages may be interposed between the area of vibration underneath the pilot and the location of an electromagnetic device or solenoid. For example, a cam or bell crank may be utilized underneath the area of vibration in place of a straight linkage 34 in FIGS. 3 and 4. The illustrated embodiments hereinbefore described are preferred because of reduction in bulk secured toward the center of the cushion whereby the comfort of the seat cushion is not impaired. However, in the event the seat cushion comprises an integral part of the cockpit seat rather than forming an attachment thereto, an electromagnetic means or the like may be more directly connected to the cushion regions to be vibrated. For instance, electromagnetic means can be disposed substantially below plates 22 and 24 within the larger seat cushion 62.

The location of the plural vibratory means in the seat cushion is a very convenient way of providing an additional sensory input to the pilot whose attention is occupied with the many aircraft instruments as well as with attempted visual recognition of his surroundings. However, the tactile information regarding divergence from the desired course is imparted to the pilot without the necessity of cumbersome additional appliances or attachments to the pilot's body. With the exception of leg clamp 30, which is optionally utilized for imparting tactile information regarding divergence from glide slope during landing, the course information is conveyed via the "seat of the pants," without attachment to the person of the pilot, while lessening pilot fatigue and the visual concentration required in instrument flying. Although the seat cushion according to the present invention is particularly useful in regard to conveying information to the pilot with respect to flight path information, it will bee appreciated the same may also be employed to provide other instrument information, warnings, and the like.

Figure 8:
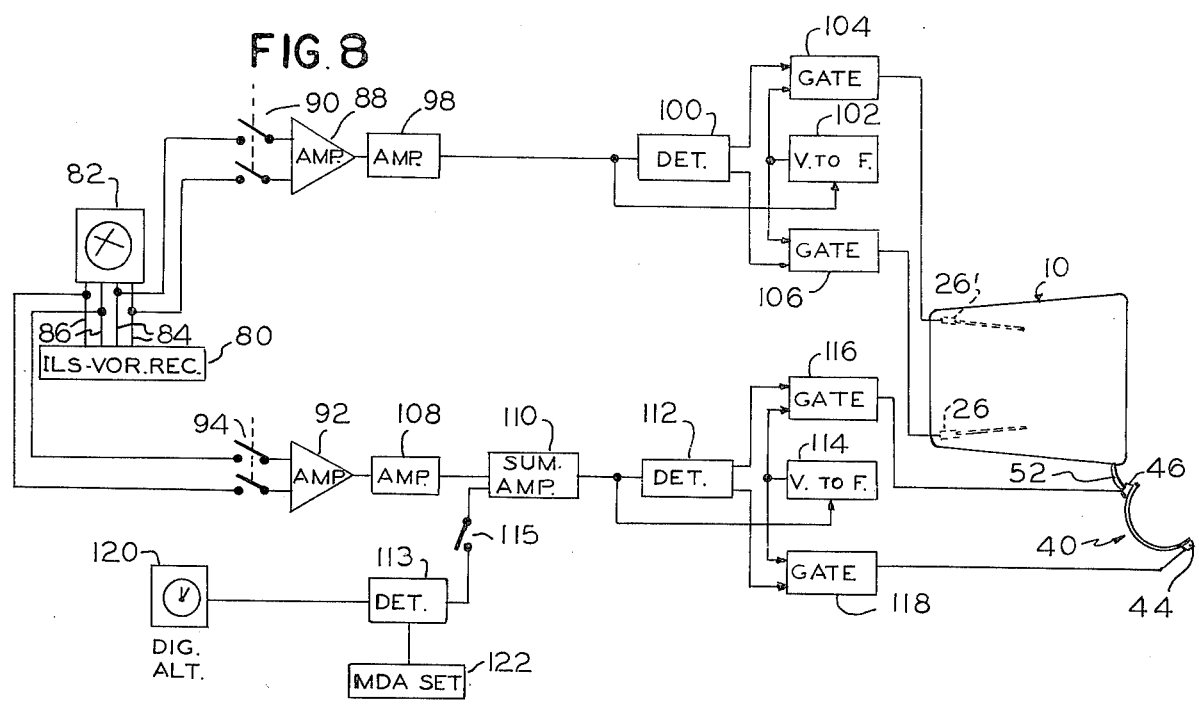
FIG. 8 is a block diagram of an aircraft indicator system according to the present invention.
Figure 9:
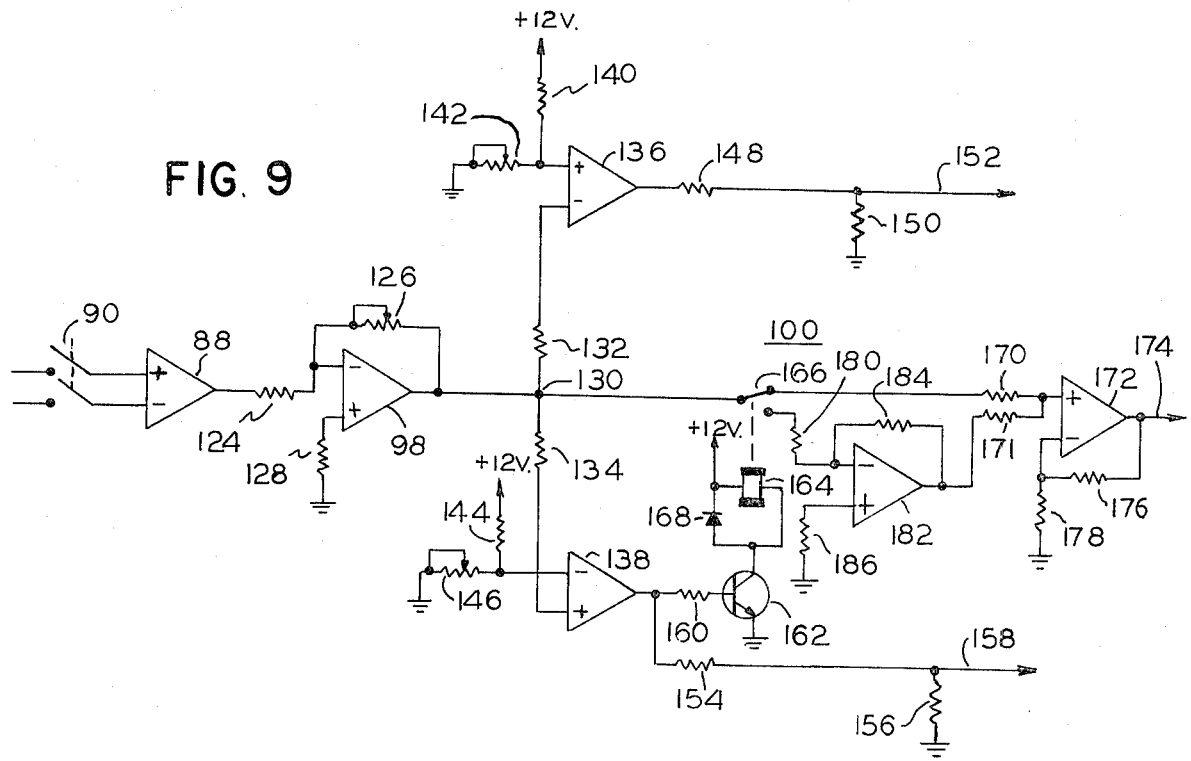
FIG. 9 is a schematic diagram of input amplifier and detector portions of the FIG. 8 system.
Figure 10:
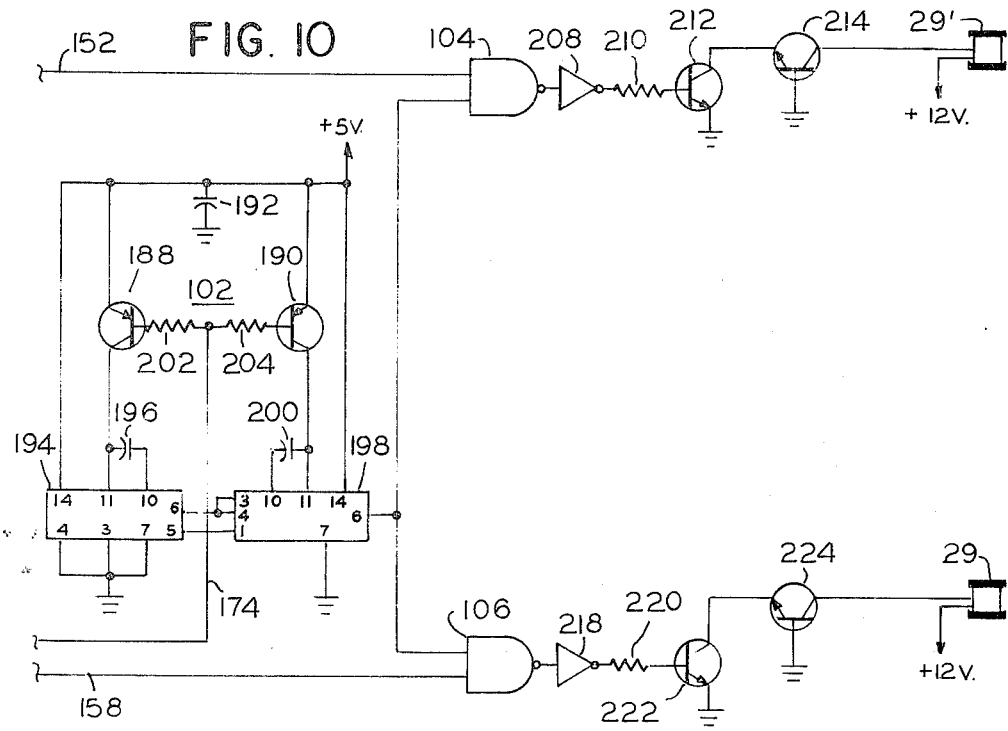
FIG. 10 is a schematic diagram of voltage-to-frequency converter and gating portions of the FIG. 8 system.
Figure 11:
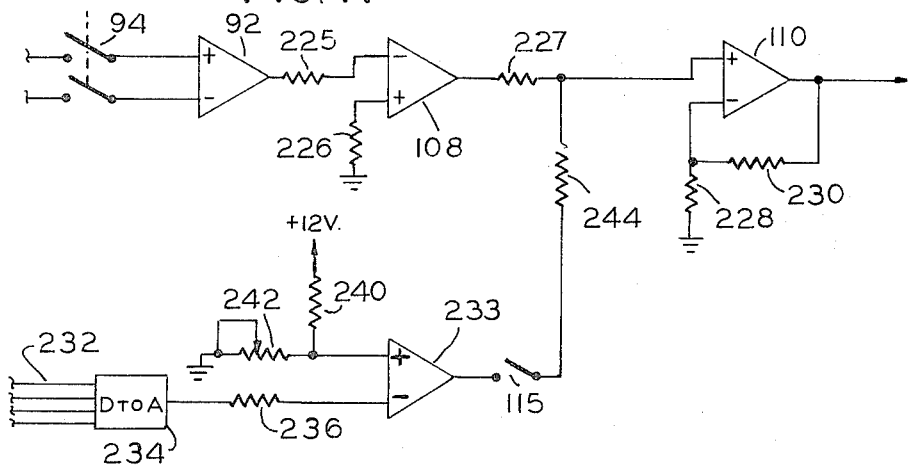
FIG. 11 is a schematic diagram of a second amplifier portion of the FIG. 8 system, for receiving glide slope and altitude information.

FIG. 8 is a block diagram illustrating control circuitry according to the present invention, while FIGS. 9 through 11 schematically illustrate the circuits in greater detail. Referring to FIG. 8, means for receiving ground transmitted signals relative to the flight path suitably comprises an ILS-VOR receiver 80 producing an output for operating the CDI or course deviation indicator 82. The CDI 82 comprises a conventional cross-pointer instrument, the pointers of which are to be centered when the course and glide slope are being correctly followed. ILS stands for Instrument Lands System, while VOR stands for Very High Frequency Omnirange, as is well known to those skilled in the art. The receiver provides a first pair of differential outputs on leads 84 indicative of course information and a second pair of differential outputs on leads 86 indicative of glide slope information. When the correct course is being followed, e.g., the aircraft is correctly lined up with a ground VOR station, d.c. voltage outputs will be equal on leads 84. If the aircraft is to the left or right of a selected course, the outputs on leads 84 will indicate by their differential nature the deviation from course, as well as the sense of the correction needed to follow the desired course. Similarly, the outputs on leads 86 indicate the divergence, and the direction of divergence of the aircraft from an ILS glide slope. In the ILS mode, localizer course information for lining upp the aircraft with the runway is also supplied on leads 84. The apparatus according to the present invention is connected to the display head comprising CDI 82 by connecting inputs in parallel with leads 84 and 86 as illustrated. The system according to the present invention supplies additional tactile information, and does not eliminate the visual display.

Leads 84 are coupled to a differential amplifier 88 via off-on switch 90, while leads 86 are coupled to a differential amplifier 92 by way of an off-on switch 94. Differential amplifiers 88 and 92 are designed to provide an output having an amplitude and polarity indicative of divergence and direction of divergence of the aircraft from the desired flight path. The output of amplifier 88 supplies course information, while the output of amplifier 92 provides the glide slope information. The output of amplifier 88 drives a further, operational amplifier 98, the output of which is coupled to a detector 100 as well as a voltage-to-frequency converter 102. The detector 100 detects a preset divergence in the output of amplifier 88, as well as the sense or polarity of such divergence, whereby the condition of departure from a given course as indicated from receiver outputs on leads 84 is ascertained. If the output of amplifier 88 departs from zero by a preset amount in a first polarity direction, detector 100 operates right-of-course gate 104, while if the polarity is the reverse, left-of-course gate 106 is energized. Gates 104 and 106 respectively provide inputs to electromagnetic means 26' at the lefthand side of seat cushion 10, and electromagnetic means 26 at the right-hand side of seat cushion 10. Thus, if the aircraft is flying to the right of course, the left-hand vibratory means is energized indicating to the pilot the direction of the correction needed, while if the aircraft is flying to the left of course, the right-hand vibratory means is energized. The voltage-to-frequency converter 102 supplies additional inputs to gates 104 and 106 by means of which the frequency of vibration of electromagnetic means 26' and 26 is determined. The higher the voltage output from amplifier 98, the farther the aircraft is from the intended course, and the greater will be the frequency output of converter 102. The range of frequency of outputs of converter 102 is from a few cycles to a few hundred cycles, and is readily distinguishable by the pilot.

The lower or glide slope channel operates in a similar manner, wherein the output of amplifier 92 is coupled via operational amplifier 108 to a summing amplifier 110 which also receives the output of an MDA detector 113 via off-on switch 115. The output of summing amplifier 110 is applied to a detector 112 and a voltage-to-frequency converter 114, these elements suitably being substantially identical to elements 100 and 102. Detector 112 operates an above-course gate 116 and a below-course gate 118 connected respectively to solenoids within housings 46 and 44 of leg clamp 40. The output leads from gates 116 and 118 are illustrated as being connected directly to the housings for purposes of diagrammatic clarity, and it is understood the actual connections therefor are preferably made via cable 42. When the aircraft is flying above the intended glide slope by more than a predetermined amount, gate 116 energizes the solenoid 48 within housing 46, suitably positioned on the underside of the pilot's leg for indicating the direction of correction needed. On the other hand, if the aircraft is flying below the correct path by more than a predetermined amount, gate 118 energizes the solenoid 54 within housing 44 which is suitably positioned proximate the upper side of the pilot's leg, again illustrating the direction of the correction required. Voltage-to-frequency converter 114 provides outputs to gates 116 and 118 causing the solenoids to vibrate at a rate indicative of the magnitude of departure from the desired glide slope.

The system also suitably includes a connection from a digital altimeter 120 which supplies a first input to a detector 113, while a second input is provided by MDA control 122 wherein MDA stands for minimum descent altitude. When the digital altimeter 120 indicates the aircraft has reached said minimum descent altitude, a comparison takes place in detector 113 causing detector 113 to supply an input via switch 114 to summing amplifier 110. The remainder of the circuit than immediately causes vibratory means associated with the leg clamp, i.e., solenoid 54, to supply a higher frequency vibration, warning the pilot to pull up if visual contact has not been made with the ground.

Referring to FIG. 9, comprising a schematic diagram for a portion of the off-course channel in the FIG. 8 system, operational amplifier 98 is supplied with an input resistor 124 coupling the output of differential amplifier 88 to the inverting input of amplifier 98, while a variable feedback resistor 126 employed as a gain control is disposed between the output of amplifier 98 and the said inverting input. A resistor 128 returns the noninverting input of amplifier 98 to ground. Amplifier 98 drives a summing point 130 of a detector 100, said summing point being connected via an input resistor 132 to the inverting input of differential amplifier 136, as well as via an input resistor 134 to the noninverting input of differential amplifier 138.

The remaining or noninverting input of differential amplifier 136 is connected to the center of a voltage divider comprising resistor 140 and variable resistor 142 connected in series between a +12 volts and ground. When the voltage at the inverting input of amplified 136 drops below the voltage set by the midpoint of the voltage divider, the output of differential amplifier 136 will go high.

The remaining or inverting input of amplifier 138 is connected to the center of a voltage divider comprising resistor 144 and variable resistor 146 connected in series between a +12 volts and ground. When the input at the noninverting input terminal of amplifier 138 rises above the voltage set by the voltage divider 144, 146, the output of amplifier 138 goes high. The variable resistors 142 and 146 are preset so as to provide a "window" of normal operation of normal voltage output at the output terminal of amplifier 98 for which neither amplifier 136 or 138 produces an operative output. The aircraft must be sufficiently off course, according to the selection made by adjustment of resistors 142 and 146, to cause one of the differential amplifiers to produce an effective output.

The output terminal of amplifier 136 is connected to one end of a voltage divider comprising resistors 148 and 150 coupled from the amplifiers output terminal to ground, with the midpoint being connected to a lead 152 which is coupled to gate 104. (See FIGS. 8 and 10.) Similarly, the output terminal of amplifier 138 is connected to one end of a voltage divider including resistors 154 and 156 disposed between the amplifier's output terminal and ground, with the center tap thereof being connected to lead 158 which is coupled to gate 106. (See FIGS. 8 and 10.)

The output of amplifier 138 is further coupled through resistor 160 to the base of a transistor 162, the emitter of which is grounded and the collector of which is connected to one terminal of the operating coil 164 of a relay, having single pole double throw contacts 166. The remaining terminal of operating coil 164 is connected to a +12 volts, and a diode 168 is shunted across the coil 164 for absorbing voltages induced when the relay coil is deenergized. The movable member of contacts 166 is connected to summing point 130, while one fixed contact is connected via input resistor 170 to the noninverting input of an operational amplifier 172. The latter amplifier further includes a feedback resistor 176 disposed between the output terminal of the amplifier and the inverting input terminal, whille the inverting input terminal is also returned to ground by means of a further resistor 178. The remaining fixed contact of the relay is coupled by means of an input resistor 180 to the inverting input of operational amplifier 182, having a feedback resistor 184 connected from the output of the amplifier to such inverting input. The noninverting input of amplifier 182 is returned to ground by means of resistor 186. The output of amplifier 182 is coupled through input resistor 171 to the noninverting input of the aforementioned amplifier 172.

The output of amplifier 172 upon lead 174 is connected to the voltage-to-frequency converter 102 (see FIGS. 8 and 10) whereby the frequency of vibration is controlled in accordance with the magnitude of the output voltage of amplifier 98. The voltage at summing point 130 is accordingly connected to normally closed of relay contacts 166 and is from there coupled through amplifier 172 to lead 174, unless the output of amplifier 98 is high enough in voltage for operating differential amplifier 138. In the latter case, the output of amplifier 138 causes transistor 162 to conduct, drawing current through relay operating coil 164 and completing an alternative circuit through operated contacts 166 to the inverting input of amplifier 182. The latter provides an alternative input to amplifier 172 whereby the ultimate output on lead 174 will be in accordance with the magnitude, but not the polarity, of the voltage at summing point 130. For an increase in voltage at summing point 130, i.e., for a voltage increasing in a positive direction, amplifier 138 will ultimately be operated, switching the relay contacts 166 whereby an inverted output is provided at lead 174 by virtue of the inverting action of amplifier 182. On the other hand, for a decreasing voltage at summing point 130, the amplifier 182 will remain out of the circuit, and a decreasing voltage will be seen at lead 174. In either case, an increase in magnitude of voltage at summing point 130 causes a negative-going increase in output on lead 174.

Referring now to FIG. 10, it will be seen that lead 152 is connected to one input of nand-gate 104, comprising the right-of-course gate, the output of which is coupled via inverter 208 and resistor 210 to the base of transistor 212. Transistor 212 has its emitter grounded and its collector connected to the emitter of current driving transistor 214. The base of transistor 214 is grounded and its collector is ultimately coupled to operating coil 29' of solenoid 26' for producing vibration at the left side of cushion 10. Similarly, lead 158 is connected to provide one input of left-of-course nand-gate 106 which drives the base of transistor 222 via inverter 218 and coupling resistor 220. The collector of transistor 222 is connected to the emitter of current driver transistor 224, the collector of the last mentioned transistor driving coil 29 of solenoid device 26, adapted to provide vibration on the right-hand side of the seat cushion.

Gates 104 and 106 each receive an additional input in order to make them functional, said input comprising the output of voltage-to-frequency converter 102. Voltage-to-frequency converter 102 includes first and second transistors 188 and 190 having their bases coupled to lead 174 by way of input resistors 202 and 204. The emitters of the transistors are connected to a +5 volts and bypassed to ground by means of capacitor 192. Each of the transistors is coupled as a variable timing resistor in a time constant circuit of a one-shot multivibrator. The one-shot multivibrators, 194 and 198, each suitably comprise a type SN54121 integrated circuit monostable multivibrator, and may be obtained from Texas Instruments, Inc. The transistor 188 has its emitter and collector electrodes connected to the terminals of the monostable multivibrator designed for connection to an external timing resistor, the terminals being marked as shown, while a timing capacitor 196 is interposed between the collector of transistor 188 and the integrated circuit terminal indicated for connection to the external timing capacitor. Similarly, the emitter and collector of transistor 190 are connected as shown to monostable multivibrator 198 and in particular to the terminals thereof adapted for connection to an external timing resistance, while capacitor 200 is interposed between the collector of transistor 190 and the remaining terminal of multivibrator 198 to which the external capacitor is designed to be connected. The monostable multivibrators 194 and 198 are crosscoupled, with the noninverted output of multivibrator 194 driving multivibrator 198, while the inverted output of multivibrator 198 drives the input of multivibrator 194. The two monostable circuits together form a free running multivibrator, the frequency of which is controlled by means of the external timing resistances comprising the transistors 188 and 190. In the present circuit, the voltage value on the input on lead 174 determines the conduction of these transistors and consequently the frequency of the overall circuit. The output comprises a square wave of the selected frequency delivered from monostable multivibrator 198 as the second input of the aforementioned gates 104 and 106.

Considering operation of the circuit of FIGS. 9 and 10, if the voltage at summing point 130 drops below the predetermined "window" level (set by resistor 142), the output of amplifier 136 as coupled to lead 152 will rise, thereby providing one input for nand-gate 104. At the same time, the magnitude of the voltage at the same summing point as coupled through amplifier 172 will determine the frequency of voltage-to-frequency converter 102. Thus, the more negative the voltage level at summing point 130, the more the transistors 188 and 190 will conduct, and the higher will be the frequency of the square wave applied as a second input to gate 104. Since gate 104 drives the coil 29' of solenoid 26' via transistors 212 and 214, the solenoid 26' will vibrate at a frequency determined according to the divergence of the aircraft to the right of the flight path, for the selected inputs.

When the voltage at summing point 130 rises above the preset "window" (as set by resistor 146), a first input will be supplied to nand-gate 106 on lead 158. Also, transistor 162 will conduct, operating contacts 166, and bringing about an inversion of the voltage at summing point 130 by way of inverting amplifier 182, and such voltage will be applied on lead 174 to the voltage-to-frequency converter. The higher the magnitude of the voltage, the greater will be the frequency of the square wave applied to gate 106, and consequently the higher the frequency of vibration caused by coil 29 of solenoid 26. The vibration thereby produced at the right-hand side of the seat cushion will be indicative of divergence from course in the opposite direction.

FIG. 11 illustrates a portion of the lower channel or glide slope channel. Amplifier 92, receiving glide slope information via switch 94, drives differential amplifier 108 through coupling resistor 225 connected to the inverting terminal of amplifier 108. The noninverting terminal of the amplifier is returned to ground by resistor 226. The output of amplifier 108 is coupled to the noninverting input of summing operational amplifier 110 through input resistor 227, and a feedback resistor 230 is interposed between the output of amplifier 110 and the inverting input thereof. A resistor 228 returns said inverting input to ground. MDA or minimum descent altitude is set by means of a variable resistor 242 (performing the function of control 122 in FIG. 8) interposed between the noninverting input terminal of detector amplifier 233 and ground, a resistor 240 completing a voltage divider with resistor 242 and coupling the noninverting terminal of the amplifier to +12 volts. A digital-to-analog converter 234 receives the output of a digital altimeter (120 in FIG. 8) on leads 232 and couples the resulting analog value by way of resistor 236 to the inverting input of amplifier 233. Amplifier 233 comprises the detector 113 of FIG. 8. The output of amplifier 233 is connected via switch 115 and input resistor 244 to the noninverting input of summing operational amplifier 110.

As long as the altitude indication, coupled via digital-to-analog converter 234, is above the MDA, or minimum descent altitude selected by variable resistor 242, the output of amplifier 233 will be low. As soon as the minimum descent altitude is reached, the output of amplifier 233 will go high, and it is designed to provide a relatively high voltage input to summing amplifier 110, so long as switch 115 is closed. The output of amplifier 110 is coupled to operate below-course gate 118 (in FIG. 8) when it goes high, while supplying an input to voltage-to-frequency converter 114, causing a relatively high frequency vibration of solenoid 54 in housing 44. Moreover, the remainder of the glide slope circuitry is suitably substantially identical to the circuitry to the right of summing point 130 in FIG. 9, whereby the below-course gate 118 and corresponding solenoid 54 are operated when the aircraft drops below a preselected "window" centered on the glide slope. It is noted an inversion takes place in amplifier 98, and a positive-going voltage at its output suitably indicates the aircraft is below glide slope. Also, when the aircraft is above a selected "window" centered on the glide slope, above-course gate 116 is operated for energizing solenoid 48. In either case, the frequency of vibration is controlled by voltage-to-frequency converter 114 whereby the frequency of vibration imparted via leg clamp 40 have a frequency indicative of a magnitude of divergence from the glide slope.

While I have shown and described several embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. An indicator system for an aircraft, said system comprising:
    on-course instrumentation in said aircraft responsive to ground transmitted radio frequency signals for providing course information relative to the ground transmitting location,
    a seat cushion in said aircraft for supporting the aircraft pilot,
    a pair of vibratory means located in said seat cushion and adapted to supply a tactile indication to the pilot at spaced positions on said seat cushion,
    and means for providing an output in response to an unbalanced output from said on-course instrumentation in said aircraft for initiating vibration of a selected of said pair of vibratory means in accordance with the direction of the unbalance detected, said vibratory means indicating divergence from a flight path in a first coordinate direction.

2. The system according to claim 1 further comprising a converter responsive to the magnitude of said unbalanced indication for causing the frequency of vibration of the selected of said pair of vibratory means to be proportional to the degree of unbalance detected.

3. The system according to claim 1 wherein said seat cushion is removably secured to a cockpit seat and includes said vibrators therewithin.

4. An aircraft indicator system for providing aircraft instrument information relative to a ground transmitted radio signal to the pilot of the aircraft through tactile stimulus, said system comprising seat means for supporting the pilot wherein said seat means includes plural spaced vibratory means for supplying tactile indication to the pilot,
    said seat means comprising a seat cushion removably secured to the cockpit seat, wherein said plural spaced vibratory means comprise a pair of vibrators positioned within said seat cushion for separately vibrating spaced portions of said seat cushion,
    said vibrators including electromechanical means positioned proximate extremities of the cushion, and linkage means for communicating vibration from said electromechanical means to spaced central locations proximate the top of the weight bearing portion of said seat cushion,
    means for selectively energizing said vibratory means, and means for controlling said energizing means from instruments of said aircraft in accordance with divergence of said aircraft from a predetermined path, wherein the said selective energization of said vibratory means indicates the direction of divergence of said aircraft from a predetermined path according to the vibratory means selected.

5. The system according to claim 4 wherein said electromechanical means each comprise a solenoid having one end of said linkage means attached to the plunger thereof.

6. The system according to claim 5 including a pair of plates at said spaced central locations proximate the top of the weight-bearing portion of said seat cushion and wherein the remaining ends of said linikage means are attached to said plates.

7. The system according to claim 5 wherein said linkage means comprises a flexible striker pivotally mounted for up and down movement by said solenoid.

8. An aircraft indicator system for providing aircraft instrument information relative to a ground transmitted radio signal to the pilot of the aircraft through tactile stimulus, said system comprising seat means for supporting the pilot wherein said seat means includes plural spaced vibratory means for supplying tactile indication to the pilot, means for selectively energizing said vibratory means, and means for controlling said energizing means from instruments of said aircraft in accordance with divergence of said aircraft from a predetermined path, said vibratory means indicating divergence from a flight path in a first coordinate direction, wherein said selective energization of said vibratory means indicates the direction of divergence of said aircraft from a predetermined path according to the vibratory means selected,
    said seat means further being provided with an extension member adapted for positioning upon the leg of the pilot, said extension member including a second pair of spaced vibratory means, and means coupling the last-mentioned pair of spaced vibratory means to said aircraft instruments for supplying indication in response to divergence of said aircraft from said flight path in a second coordinate direction.

9. The system according to claim 8 wherein said extension comprises a U-shaped leg clamp and wherein the last-mentioned vibratory means comprise solenoid vibrators mounted proximate extremities of said leg clamp.

10. The system according to claim 8 wherein the vibratory means of said seat cushion are coupled to said aircraft instruments for indicating divergence of said aircraft from a predetermined course and wherein the vibratory means mounted on said extension are coupled for indicating divergence of said flight path from a selected glide slope.

11. The system according to claim 10 further including minimum descent altitude means responsive to a preset altitude for causing the frequency of vibration of vibratory means supplying an output indicative of divergence from a predetermined glide slope to increase to a predetermined frequency value.

12. The system according to claim 8 including means responsive to magnitude of divergence of instrument output from a predetermined value for causing the vibration of at least one of said vibratory means to have a frequency proportional to the magnitude of divergence.

13. An aircraft indicator system including instruments in said aircraft for providing course and glide slope information, said system comprising:
 a first pair of vibratory means and a second pair of vibratory means adapted for providing tactile stimulation to the aircraft pilot,
 a first detector for providing an output in response to an unbalanced output from on-course instrumentation in said aircraft for initiating vibration of a selected of said first pair of vibratory means in accordance with the sense of the unbalance detected.
 a converter responsive to the magnitude of said unbalanced indication for causing the frequency of vibration of the selected of said first pair of vibratory means to be proportional to the degree of unbalance detected,
 a second detector for providing an output in response to an unbalanced output from glide slope instrumentation in said aircraft for initiating vibration of a selected of said second pair of vibratory means in accordance with the sense of unbalance detected,
 and a second converter responsive to the magnitude of the unbalanced output from the glide slope instrumentation for causing the frequency of vibration of the selected of said second pair of vibratory means to be proportional to the degree of unbalance in the output of the glide slope instrumentation detected.

14. The system according to claim 13 further including minimum descent altitude means comprising a detector for providing an output when the altitude of said aircraft drops below a predetermined value, and means for coupling the last mentioned detector for causing vibration of at least one of said second pair of vibratory means when the altitude of the aircraft drops below said predetermined value.

* * * * *

UNITED STATES PATENT AND TRADEMARK OFFICE
CERTIFICATE OF CORRECTION

PATENT NO. : 3,902,687
DATED : September 2, 1975
INVENTOR(S) : Robert E. Hightower It is certified that error appears in the above-identified patent and that said Letters Patent are hereby corrected as shown below:

Column 1, line 57, "witha" should be --with a--.
Column 4, line 62, "lefthand" should be --left-hand--.
Column 5, line 56, "bee" should be --be--.
Column 6, line 1, "Lands" should be --Landing--.
Column 6, line 2, after "while" insert --the--.
Column 6, line 18, "upp" should be --up--.
Column 6, line 48, "lefthand" should be --left-hand--.
Column 8, line 1, "of" (second occurrence) should be --or--.
Column 8, line 33, "whille" should be --while--.

Signed and Sealed this twenty-fourth Day of February 1976

[SEAL]

Attest:

RUTH C. MASON
Attesting Officer

C. MARSHALL DANN
Commissioner of Patents and Trademarks